Jan. 16, 1968 I. GOODMAN ETAL 3,364,430
YIG TUNED DISCRIMINATOR
Filed Nov. 23, 1964
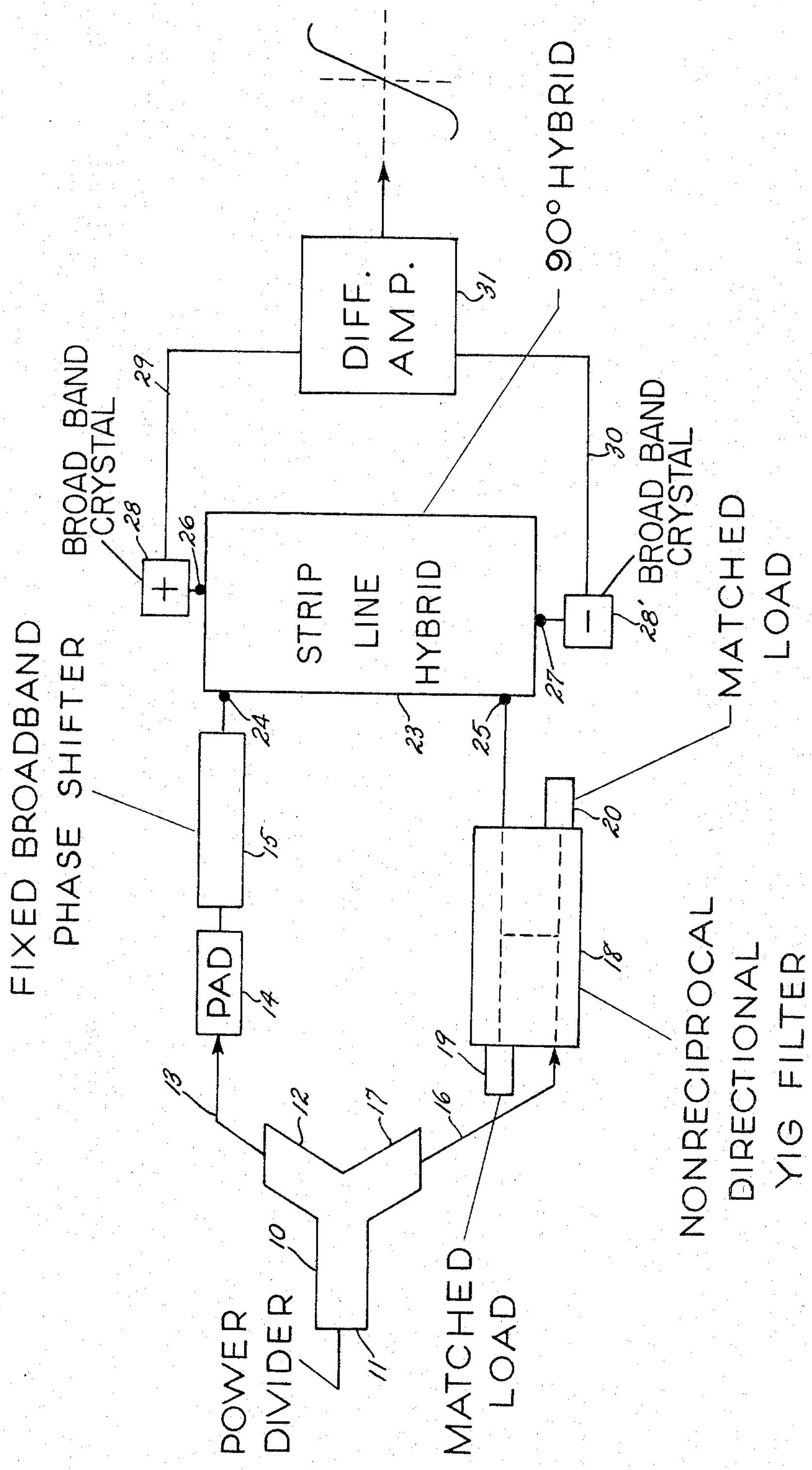

3,364,430

YIG TUNED DISCRIMINATOR

Ira Goodman, Jericho, and Morris Cohen, Oceanside, N.Y., assignors to Loral Electronics Corporation, Bronx, N.Y., a corporation of New York Filed Nov. 23, 1964, Ser. No. 412,994
2 Claims. (Cl. 329—116)

ABSTRACT OF THE DISCLOSURE

An improved tuned discriminator employing a single bandpass filter employing gyromagnetic material, and including a fixed broadband phase shifter, a differential amplifier, and a non-reciprocal directional yttrium iron garnet filter.

This invention relates generally to the field of high frequency radio transmission, and more particularly to an improved tuned discriminator employing gyromagnetic components.

In the present art, tuned bandpass filters required for discriminator networks conform to a standard single resonator structure, and since the two tuned filters must be frequency spaced from each other, two magnetic field densities (two magnets) must be employed. The use of two separate filters presents two basic problems, namely that of frequency tracking and amplitude matching and tracking.

It is among the principal objects of the present invention to provide an improved YIG tuned discriminator network for achieving a required discriminator response using only a single bandpass filter of gyromagnetic material.

Another object of the invention lies in the position of improved discriminator circuit construction in which the problem of amplitude matching and frequency tracking control problems arising from the use of two resonators and two magnets is completely eliminated.

Yet another object of the invention lies in the provision of an improved discriminator circuit in which the cost of fabrication may be materially reduced as contrasted with those circuits employing two resonators and magnets, thereby permitting consequent wide sale, distribution and use.

These objects, as well as other incidental ends and advantages, will more fully appear in the progress of the following disclosure and be pointed out in the appended claims.

In the drawing, to which reference will be made in the specification, the single figure is a schematic view of an embodiment of the invention.

In accordance with the invention, there is illustrated in FIGURE 1 a power divider 10, one branch 11 of which receives an input signal. A second branch 12 connects with a first transmission line 13 leading to a pad 14, the pad 14 being in turn connected to a fixed broadband phase shifter 15. A second line 16 connected to another branch 17 of the power divider 11 leads to a non-reciprocal directional filter 18 of the type including a sphere of gyromagnetic material placed in the field of a magnet. The most suitable type of filter sphere is formed from yttrium-iron-garnet crystals, and is usually referred to in the art as a "YIG" filter. The filter 18 is provided with matched load resistors at 19 and 20.

The outputs of the YIG filter 18 and broadband phase shifter, 15 respectively are connected through a ninety degree strip line hybrid 23 at ports 24 and 25, respectively.

Ports 26 and 27 are each connected to notched broadband crystals 28 and 28', respectively, which are of opposite polarity, the outputs of the same being directed along conductors 29 and 30, respectively, to a difference amplifier 31.

During operation, the power divider 10 feeds lines 13 and 16 which are equal in length (electrically). The line 16 connects with a resonant element, i.e. the directional YIG filter 18, while line 13 is provided only with a fixed broadband shifter 15. The purpose of the directional type YIG filter is to present a match to the input power splitter at all times.

This in effect does away with the need for a padded power splitter, and in effect enhances the overall loss of the system. The purpose of the broadband phase shifter is to choose a point on the filter curve as the zero point for the discriminator. It is evident from the circuit diagram shown in FIGURE 1, that if a pure reactance (i.e. 90 degrees) is assumed at the 15 db point on the skirt of the filter in transmission line 16, a broadband 90 degree phase shifter in line 13 would yield zero output from the difference amplifier. However, at any other frequency, the RF line 16 would suffer a leading or lagging phase difference with line 13. This differential phase shift will cause one crystal to have a greater output and the other crystal to have a lesser output. The frequency discriminator thus functions by taking the output of the two crystals and feeding them to the difference amplifier.

I wish it to be understood that I do not consider the invention limited to the precise details and structures shown and set forth in this specification, for obvious modifications will occur to those skilled in the art to which the invention pertains.

I claim:

1. In a discriminator circuit, a power input source, a transmission line power divider having first and second outputs, a 90 degree hybrid transmission element having four ports, first and second transmission lines interconnecting said first and second outputs with two ports on said 90 degree hybrid, first and second broadband crystals connected through the remaining two ports of said 90 degree hybrid, a difference amplifier having an input leading from each of said first and second crystals, and an output carrying the difference between first and second inputs, a non-reciprocal directional gyromagnetic filter connected in series with said first transmission line, and a fixed broadband phase shifter connected in series with the second transmission line.

2. In a high frequency discriminator circuit, a power input source, a transmission line power divider having first and second outputs, a first transmission line connected to said first power divider output, a matching pad and a fixed broadband phase shifter connected in series to said first transmission line, a non-reciprocal directional gyromagnetic filter connected to said second transmission line, a 90 degree hybrid having four ports, the output of said fixed broadband phase shifter being connected to one of said ports, the output of said gyromagnetic filter being connected to another of said ports, a broadband crystal connected to each of the remaining ports on said 90 degree hybrid, said crystal being of opposite polarity, and a difference amplifier connected to the output of each of said crystals to sum the output thereof.

References Cited

UNITED STATES PATENTS

| | | | |
|---|---|---|---|
| 3,139,592 | 6/1964 | Sisson | 333—241 X |
| 3,221,251 | 11/1965 | Margerum et al. | 329—160 X |
| 3,235,819 | 2/1966 | Carvelas et al. | 330—4.5 X |
| 3,247,472 | 4/1966 | Turner | 329—116 X |
| 3,274,519 | 9/1966 | Nathanson | 329—116 X |

ALFRED L. BRODY, *Primary Examiner.*

ROY LAKE, *Assistant Examiner.*